(12) United States Patent
Fujimoto et al.

(10) Patent No.: US 8,506,880 B2
(45) Date of Patent: Aug. 13, 2013

(54) IRON BATH-TYPE MELTING FURNACE

(75) Inventors: Hideaki Fujimoto, Kobe (JP); Korehito Kadoguchi, Kobe (JP); Kiminori Hajika, Kobe (JP); Hiroshi Sugitatsu, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 207 days.

(21) Appl. No.: 13/056,985

(22) PCT Filed: Aug. 6, 2009

(86) PCT No.: PCT/JP2009/063963
§ 371 (c)(1),
(2), (4) Date: Feb. 1, 2011

(87) PCT Pub. No.: WO2010/016553
PCT Pub. Date: Feb. 11, 2010

(65) Prior Publication Data
US 2011/0156326 A1  Jun. 30, 2011

(30) Foreign Application Priority Data
Aug. 8, 2008 (JP) .................. 2008-205710

(51) Int. Cl.
*C21B 11/00* (2006.01)
(52) U.S. Cl.
USPC ............................. 266/236; 266/45
(58) Field of Classification Search
USPC .................................. 266/236, 45
See application file for complete search history.

(56) References Cited

U.S. PATENT DOCUMENTS

| | | | | |
|---|---|---|---|---|
| 1,797,566 A | * | 3/1931 | Brown | 266/272 |
| 1,887,453 A | * | 11/1932 | Emmel | 420/29 |
| 2,523,092 A | * | 9/1950 | Bryk et al. | 75/10.58 |
| 4,072,531 A | * | 2/1978 | Funabiki et al. | 523/140 |
| 4,080,196 A | * | 3/1978 | Gold | 75/468 |
| 4,082,718 A | * | 4/1978 | Ando et al. | 523/140 |

FOREIGN PATENT DOCUMENTS

JP  62 224611  10/1987
(Continued)

OTHER PUBLICATIONS

International Search Report issued Sep. 29, 2009 in PCT/JP09/063963 filed Aug. 6, 2009.
(Continued)

*Primary Examiner* — Scott Kastler
(74) *Attorney, Agent, or Firm* — Oblon, Spivak, McClelland, Maier & Neustadt, L.L.P.

(57) ABSTRACT

An iron melting furnace has a refractory lined furnace body having a top opening through which raw materials including a raw material iron source, a carbonaceous material and a slag forming material may be introduced. A heating system is provided for injecting oxygen-containing gas into the furnace body to combust the carbonaceous material, whereby combustion heat can melt the raw material iron source to generate molten iron and molten slag to form a molten iron and slag bath. A plurality of tap holes penetrate the furnace body and are provided at positions different from one another in a height direction of the furnace body, and a refractory filling which is different from the refractory liner material fills at least one of the tap holes such that molten iron or slag in the furnace is unable to flow through the tap hole being filled with the refractory material.

4 Claims, 6 Drawing Sheets

(56) References Cited

FOREIGN PATENT DOCUMENTS

| | | |
|---|---|---|
| JP | 63 035712 | 2/1988 |
| JP | 05-171237 | 7/1993 |
| JP | 2000 319716 | 11/2000 |
| JP | 2001 011515 | 1/2001 |
| JP | 2003 120924 | 4/2003 |
| JP | 2004 061033 | 2/2004 |

OTHER PUBLICATIONS

Office Action issued Jun. 19, 2012, in Chinese Patent Application No. 200980122176.1 with English translation.

Notification of Reasons for Refusal issued Feb. 26, 2013 in patent application No. 2008-205710 w/English Translation.

Office Action issued Nov. 29, 2012, in Taiwan Application No. 098126662. (w/English Language Translation).

* cited by examiner

AT THE START OF USING TAP HOLE 9a

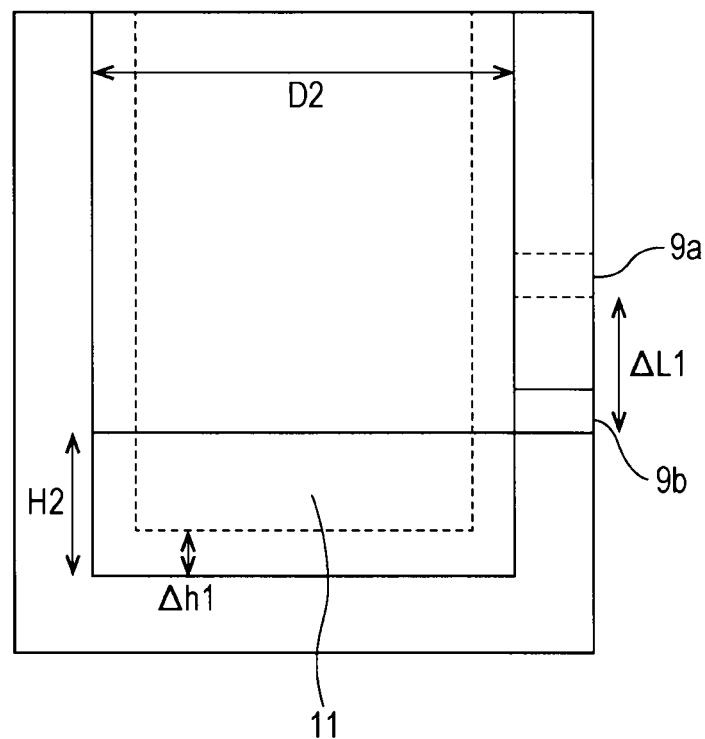

IRON BATH-TYPE MELTING FURNACE

TECHNICAL FIELD

The present invention relates to an iron bath-type melting furnace that produces molten iron by melting raw material iron sources such as solid reduced iron and scraps.

BACKGROUND ART

In an iron bath-type melting furnace, carbon in hot metal and/or a carbonaceous material supplied is combusted by oxygen injection to melt a raw material iron source and to thereby manufacture molten iron. The molten iron in the furnace needs to be discharged outside the furnace. Various methods for discharging the molten iron have been proposed but all have had problems such as those described below. Currently, there is no established method for discharging the molten iron.

Many proposals have been made on methods that use conventional converter-type furnaces as the molten bath-type melting furnaces (e.g., refer to PTL 1). However, when a converter-type furnace is used as an iron bath-type melting furnace, oxygen injection is stopped (in other words, production of the molten iron is interrupted) and the furnace body is tilted to discharge molten iron and molten slag (hereinafter also simply referred to as "slag"). Thus, the productivity of the molten iron decreases due to this discontinuation of injection. Moreover, since the temperature of molten iron in the furnace decreases due to the heat loss from the furnace body surface to the ambient air during tapping, operation for compensating the temperature decrease and raising the temperature must be conducted for next injection before raw material iron sources are charged. This has resulted in a further decrease in productivity of molten iron.

Another example of an iron bath-type melting furnace which has been disclosed is a continuous tapping-type melting furnace in which tap holes are formed in a side wall of the furnace bottom, a refractory structure called a forehearth is provided in the front of the tap holes, and a channel for continuous tapping extending from the tap holes to the tap position leading to a tapping runner is provided inside the refractory structure (forehearth) (refer to PTL 2). However, according to the continuous tapping-type melting furnace, heat loss between the forehearth and the tapping runner is large, requiring heating with an auxiliary burner or the like. Moreover, when melting and injection is discontinued due to facility trouble in, for example, raw material supply facilities or oxygen supply facilities, hot metal and molten slag will solidify and clog between the forehearth and the tapping runner, requiring many hours and high cost for recovery. Furthermore, since the hot metal is discharged continuously instead of in batches, it takes time for a ladle to receive the hot metal in an amount needed for use in the subsequent steelmaking step which is a batch process. Thus cooling of the hot metal discharged early cannot be ignored and, at worst, the hot metal may become solidified in the ladle.

Also disclosed is an iron bath-type melting reducing furnace according to which hot metal and molten slag are intermittently discharged outside the furnace through a fixed tap hole and a fixed slag-off hole in a furnace wall while keeping the furnace body erect (refer to PTL 3). However, it is anticipated that when hot metal and molten slag are discharged through the fixed tap hole and the slag-off hole, block refractories of the tap hole (hereinafter also simply referred to as "refractories") and the refractories of the slag-off hole will be significantly worn due to the hot metal flow and oxidation caused by high-FeO-containing slag, respectively, thereby leading to a problem of an extremely short furnace life. In order to extend the furnace life, the refractories of the tap hole and the slag-off hole may be repaired, but this requires many hours of shut down and results in a significant decrease in productivity.

CITATION LIST

Patent Literature

PTL 1: Japanese Examined Patent Application Publication No. 3-49964
PTL 2: Japanese Unexamined Patent Application Publication No. 2001-303114
PTL 3: Japanese Examined Patent Application Publication No. 5-125419

SUMMARY OF INVENTION

Technical Problem

An object of the present invention is to provide an iron bath-type melting furnace that manufactures molten iron by melting a raw material iron source with combustion heat generated from oxygen-containing gas and carbon in hot metal and/or a carbonaceous material supplied, the iron bath-type melting furnace having a significantly long furnace life while maintaining high productivity stably over a long time.

Solution to Problem

In order to ensure productivity among the challenges described above, the inventors of the present invention have conceived that tapping may be conducted while maintaining the furnace body erect, not by tilting as disclosed in Patent Document 1 described above. However, since continuous tapping has many technical challenges and is difficult to put to practical use, as described in Patent Document 2, the intermittent tapping method is employed as in Patent Document 3. Then the inventors have conceived that it is effective to improve the arrangement and structure of the tap hole and slag-off hole that determine the furnace life in order to significantly extend the furnace life, have conducted various studies, and have completed the following invention.

A first embodiment of the present invention provides an iron bath-type melting furnace including a furnace body and a plurality of tap holes which penetrate the furnace body and which are provided at positions different from one another in a height direction of the furnace body, in which a raw material iron source is charged into the furnace together with a carbonaceous material and a slag-forming material and oxygen-containing gas is injected so that combustion heat generated by combustion of the carbonaceous material and/or carbon in molten iron melts the raw material iron source, thereby generating molten iron and molten slag, and the plurality of tap holes are sequentially used to intermittently discharge the molten iron and the molten slag from the furnace by switching between the tap holes one by one from the uppermost tap hole and proceeding downward while keeping the furnace body erect to thereby manufacture molten iron.

According to a second embodiment of the present invention, the switching between the tap holes may be conducted according to a position of a bath surface of a molten iron layer that changes with progress of wear of furnace lining refractories under conditions that maintain the mass of the molten iron layer retained in the furnace in a particular range.

According to a third embodiment of the present invention, each of the plurality of tap holes may be provided, in advance, with a refractory composed of one or more materials most suitable for the order of use.

Advantageous Effects of Invention

According to the present invention, since tapping can be conducted while keeping the furnace body erect, the molten iron productivity can be stably maintained high. Since the plurality of tap holes provided in the height direction of the furnace wall are used one by one by switching, wearing of refractories is dispersed among the tap holes and the furnace life is significantly extended compared to the conventional furnace in which wear has progressed in refractories of one tap hole.

BRIEF DESCRIPTION OF DRAWINGS

FIG. 2B is a vertical cross-sectional view of an iron bath-type melting furnace for describing a method for determining the distance between tap holes in a height direction.

DESCRIPTION OF EMBODIMENTS

Embodiments of the present invention will now be described in detail with reference to the drawings.

[Structure of Iron Bath-Type Melting Furnace]

Figure 1:
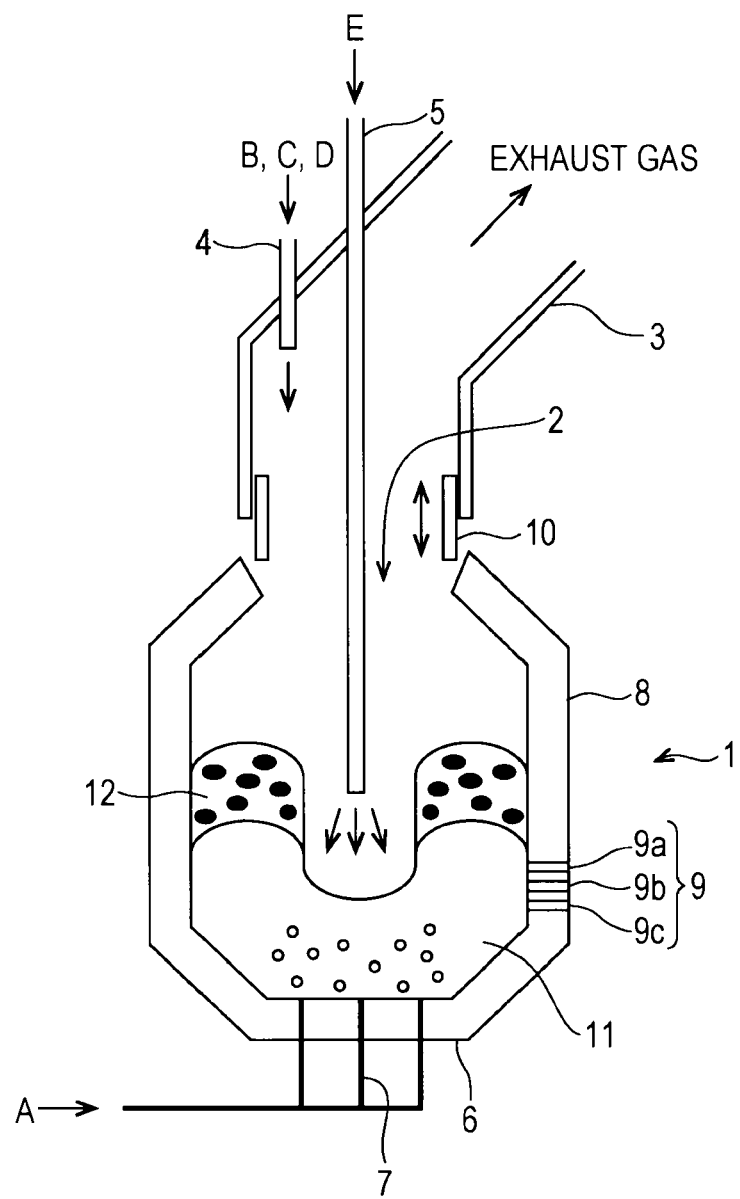
FIG. 1 is a vertical cross-sectional view showing a schematic structure of an iron bath-type melting furnace according to an embodiment.

FIG. 1 shows a schematic structure of an iron bath-type melting furnace according to an embodiment of the present invention. An iron bath-type melting furnace (may also simply referred to as "furnace" hereinafter) 1 of this embodiment is a vertical reaction furnace. A throat 2 thereof is equipped with an exhaust gas duct 3 for discharging combustion gas generated in the furnace to outside the furnace, a raw material charging chute 4 for charging a raw material iron source, a carbonaceous material, and a slag-forming material into the furnace, and a top lance 5 for injecting oxygen-containing gas into the furnace. A furnace bottom 6 has a plurality of bottom tuyeres 7.

A plurality of tap holes 9 (three tap holes 9a, 9b, and 9c in this example) are formed in a furnace wall 8 in the height direction thereof.

The distances (level differences) between the tap holes in the height direction can be determined as follows, for example.

A method for determining the distance (level difference) between the tap holes 9a and 9b in the height direction is described as one example. As described below, depending on the progress of the wear of the refractories of the tap hole 9a, the tap hole 9a at the uppermost stage is switched to the tap hole 9b at the next stage. However, during the time between when the furnace is new and when the tap holes are switched, not only the refractories of the tap hole 9a but also furnace lining refractories of other portions undergo wear.

Meanwhile, in order to maintain the melting rate of the raw material iron source as constant as possible, it is recommended that the mass of a molten iron layer 11 retained in the furnace (molten iron retention amount) be maintained in a particular range (this range of set to the amount of retained hot metal equivalent to one tapping).

Thus, in order to maintain the molten iron retention amount within a particular range, the bath surface level of the molten iron layer 11 lowers with the progress of the wear of the furnace refractories. The distance (level difference) $\Delta L_1$ between the tap holes 9a and 9b in the height direction is preferably matched with the lowering of the bath surface level of the molten iron layer 11 that occurs during the time between when the furnace is new and when the tap holes are switched for the first time, and is determined by the following equation (1) (refer to FIGS. 2A and 2B).

$$\Delta L_1 = [1-(D_1/D_2)^2] \times H_1 + \Delta h_1 \qquad \text{equation (1)}$$

Here, $H_1$: depth of the molten iron layer when the furnace is new, $D_1$: average furnace inner diameter when the furnace is new, $D_2$: average furnace inner diameter when the tap holes are switched for the first time, $\Delta h_1$: average amount of erosion that occurs in bottom refractories during the time between when the furnace is new and when the tap holes are switched for the first time.

$D_2$ and $\Delta h_1$ may be estimated on the basis of the measurement results of the thickness of remaining refractories of an old furnace, for example.

The distance (level difference) between the tap holes 9b and 9c in the height direction can be determined in the same manner.

The tap holes 9a, 9b, and 9c may be aligned in a perpendicular direction but are more preferably adequately displaced from each other in the furnace circumference direction. In this manner, the progress of wear of refractories near the tap holes 9 can be distributed not only in the height direction of the furnace wall but also in the furnace circumference direction. Thus, the furnace life can be extended.

Figure 3:
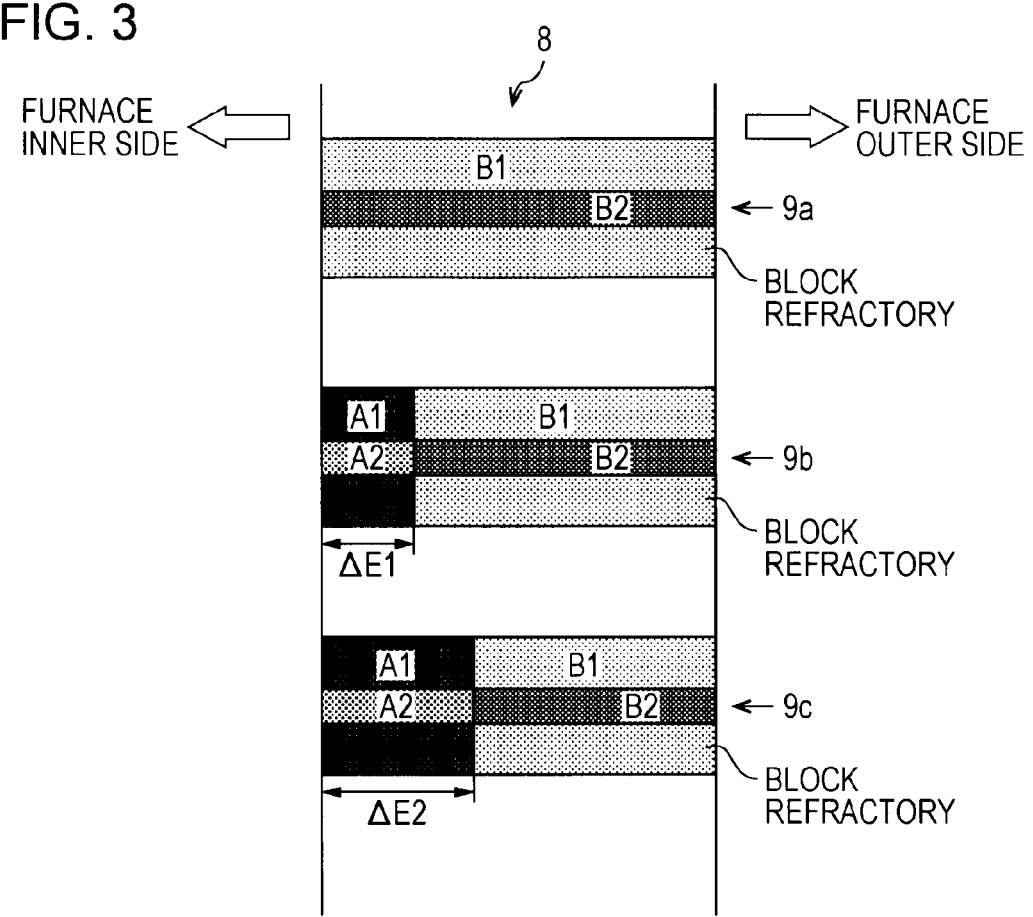
FIG. 3 is a partial vertical cross-sectional view schematically showing an embodiment of materials for refractories of tap holes provided in the height direction of a furnace wall.

When the furnace is new, the tap holes 9a, 9b, and 9c are kept closed by filling the holes with refractories that can be drilled through by tap hole openers. It is recommended that, as shown in FIG. 3, one or more refractory materials that are most suitable for the order of use (in this example, the order is 9a, 9b, and 9c) be provided in advance.

In other words, in the example shown in the drawing, a refractory B1 (for example, SiC: 60%, $Al_2O_3$: 20%, C: 5%, $SiO_2$: 15% [% is on a mass basis and the same applies hereinafter]) is used as a block refractory in the tap hole 9a used first by considering the resistance to slag erosion and resistance to slag oxidation, and a refractory B2 (for example, SiC: 50%, $Al_2O_3$: 30%, C: 5%, $SiO_2$: 15%) is used as a refractory that fills the hole (hole filling refractory) by considering the resistance to slag erosion and the resistance to wear against molten iron flow.

When the furnace is new, the tap hole 9a is close to the slag/molten iron interface and thus the block refractory and the hole filling refractory are selected by considering that these refractories are readily affected by erosion and oxidation caused by the slag.

In contrast, as for the tap holes 9b and 9c under the tap hole 9a, the materials for both the block refractory and the hole filling refractory are changed between the range (ΔE1 and ΔE2) in which erosion can occur before the scheduled start time of use and the range which is on the furnace outer side of the aforementioned range.

In other words, in the ranges ΔE1 and ΔE2 in which erosion can occur, a refractory A1 (for example, $Al_2O_3$: 70%-SiC: 15%-C: 5%-$SiO_2$: 10%) is used as a block refractory by considering the wear resistance against the molten iron flow, and a refractory A2 (for example, $Al_2O_3$: 80%-SiC: 10%-C: 5%-$SiO_2$: 2.5%) is used as a hole filling refractory by considering the wear resistance against the molten iron flow and the ease of operation for opening the hole.

In contrast, the same refractories B1 and B2 as those of the tap hole 9a are used in the ranges on the furnace outer side of the ranges ΔE1 and ΔE2. The tap holes 9b and 9c are distant from the slag/molten iron interface compared to the tap hole 9a until they are used and thus the influence of erosion and oxidation caused by the slag is not so great. Rather, the influence of wear caused by the molten iron flow generated during use of the upper hole located is great.

A melting step of melting a raw material iron source B to generate molten iron and slag using the iron bath-type melting furnace 1 and a tapping step of discharging the molten iron and the slag generated in the melting step from the furnace will now be described with reference to FIG. 1.

[Melting Step]

While stirring the molten iron layer 11 by injecting inert gas, e.g., nitrogen gas A, through the plurality of bottom tuyeres 7 into the molten iron layer 11 in the iron bath-type melting furnace 1, a raw material iron source, e.g., solid reduced iron B, a carbonaceous material, e.g., coal C, and slag-forming materials, e.g., calcined lime and light burnt dolomite D are charged by, for example, dropping using the gravity through the raw material feed chute 4 from the upper part of the iron bath-type melting furnace 1. Then oxygen-containing gas, e.g., oxygen gas E, is injected from the top through the top lance 5 so that the solid reduced iron B is melted by the combustion heat produced by combusting the carbon in the molten iron 11 and/or the carbonaceous material C to thereby produce the molten iron 11. Scraps, pig iron, mill scales, and the like may be used in combination as the raw material iron source.

When the particle size of the carbonaceous material C charged into the iron bath-type melting furnace 1 is excessively small, the particles tend to scatter into the exhaust gas. When the particle size is excessively large, the FeO concentration in the slag layer 12 does not decrease sufficiently and the carburization rate in the molten iron layer 11 is lowered. Thus, the average particle size is preferably 2 to 20 mm and more preferably 3 to 15 mm.

In order to ensure fluidity of the slag layer 12 and accelerate the desulfurization of the molten iron, the basicity $CaO/SiO_2$ (mass ratio) of the slag layer 12 is preferably adjusted within the range of 0.8 to 2.0 and more preferably in the range of 1.0 to 1.6.

The post combustion ratio can be controlled to a recommended value (40% or less, preferably 10% to 35%, and more preferably 15% to 30%) by adjusting the flow of the top-injected oxygen gas D and/or the height of the top lance 5. As a result, the consumption of the carbonaceous material can be reduced without putting an excessively high thermal load to the refractories of the iron bath-type melting furnace 1.

When the oxygen gas D is injected from the top, the slag layer 12 is stirred, and melting of the solid reduced iron B into the molten iron layer 11 and the carburization of the carbonaceous material C into the molten iron layer 11 are accelerated at the interface between the molten iron layer 11 and the slag layer 12 because of the synergistic effect with the stirring of the molten iron layer 11 with the bottom-injected nitrogen gas A. The C content in the molten iron is preferably 3 mass % or more and more preferably 3.5 to 4.5 mass %. This is favored because the total Fe content in the slag layer 12 is decreased to about 10 mass % or less, preferably about 5 mass % or less, and more preferably about 3 mass % or less, the desulfurization of the molten iron layer 11 is accelerated, and erosion of the furnace lining refractories by the molten FeO can be suppressed.

[Tapping Step]

After the melting operation is continued for a particular length of time as described above and one-tap of the slag and the molten iron is stored, tapping is conducted using the tap hole 9a at the uppermost stage (in other words, intermittent tapping is conducted). As with the tapping operation for blast furnaces, the tap hole 9a is opened by a tap hole opener not shown in the drawing while keeping the furnace erect without tilting, the molten iron is discharged first until the bath surface reaches the level of the tap hole 9a, and then the slag is discharged.

It is preferable to at least continue supplying the top-injected oxygen gas (oxygen-containing gas) E during tapping so that the temperature of the molten iron in the furnace is maintained at a preset minimum molten iron temperature or higher.

When supply of the top-injected oxygen gas (oxygen-containing gas) E is continued, the decrease in temperature of the molten iron in the furnace during tapping can be suppressed due to the combustion heat generated by the combustion of the coal (carbonaceous material) C and/or carbon in the molten iron.

The minimum molten iron temperature may be set, for example, to 1400° C. to 1500° C. considering the fluidity during tapping and the temperature decrease affected by the transportation means and the length of time up to a next step.

It is more preferable to continue charging of coal (carbonaceous material) C in addition to continuing supply of top-injected oxygen gas (oxygen-containing gas) E during tapping.

When charging of the coal (carbonaceous material) C is continued, the C concentration in the molten iron and the carbonaceous material content in the slag layer 12 can be maintained and slag foaming can be prevented.

It is more preferable to continue charging of solid reduced iron (raw material iron source) B in addition to continuing supply of coal (carbonaceous material) C and top-injected oxygen gas (oxygen-containing gas) E during tapping.

When charging of the solid reduced iron (raw material iron source) B is continued, molten iron can be produced during tapping also.

It is more preferable to continue charging of slag-forming materials D in addition to continuing supply of top-injected oxygen gas (oxygen-containing gas) E, charging of coal (carbonaceous material) C, and charging of solid reduced iron (raw material iron source) B.

When charging of the slag-forming materials D is continued, the composition of the molten slag can be maintained and slag foaming can be more assuredly prevented.

Preferably, the height position (lance height) of the lower end of the top lance 5 is controlled along with the change in the bath surface level in the iron bath-type melting furnace 1 during tapping. The lance height may be changed continuously or stepwise.

In particular, since the bath surface level decreases by tapping, the distance between the lower end of the top lance 5 and the bath surface level increases if the height position (lance height) of the lower end of the top lance 5 is fixed. Thus, the oxygen injection condition and the combustion condition in the furnace will change, the amount of the combustion gas generated and the amount of heat transferred to the molten bath will change, and the temperature of the molten bath will fluctuate. Accordingly, it is preferable to lower the height position (lance height) of the lower end of the top lance 5 along with the change in the height position of the bath surface to maintain the distance between the lower end of the top lance 5 and the bath surface constant and to thereby suppress changes in the oxygen injection condition and the combustion condition as much as possible.

As described above, since the temperature of the molten iron in the furnace is maintained high also during tapping and the molten iron having a large heat capacity is discharged first, the tap hole 9a is sufficiently warmed, cooling of the slag subsequently discharged can be suppressed, and solidification of the slag can be more securely prevented.

Note that the bath surface is the upper surface of the molten iron layer 11 but may be an upper surface of the molten slag layer 12 instead.

After a particular amount of slag is discharged, the tap hole 9a may be closed with mud using a mud gun.

During the tapping step, the tap amount (volume) with time from the onset of tapping may be measured, and the height position (lance height) of the lower end of the top lance 5 may be controlled on the basis of the relationship among the tap amount determined by the measurement, the time elapsed from the onset of tapping, and the shape of the interior of the furnace.

Instead of measuring the volume at the tapping surface, the weight tapped may be measured with a load cell.

Alternatively, the height position (bath surface level) of the bath surface during tapping may be directly measured with a level meter such as a microwave level meter and the height position (lance height) of the lower end of the top lance may be controlled on the basis of the measurement values.

Alternatively, the height position (lance height) of the lower end of the top lance may be controlled on the basis of the composition of exhaust gas from the molten iron-type melting furnace during tapping.

In other words, when the distance between the lower end of the top lance 5 and the bath surface is changed, the injection condition and the combustion condition inside the furnace are changed, and the exhaust gas composition, e.g., CO and $CO_2$ concentrations, is changed. Thus, for example, changes in the injection condition and the combustion condition in the furnace can be suppressed as much as possible by controlling the lance height so that the CO concentration and/or the $CO_2$ concentration in the exhaust gas is within a particular range (e.g., a CO concentration of 20% to 25%). Note that the lance height may be controlled on the basis of the post combustion ratio instead of the CO concentration and/or $CO_2$ concentration.

When the melting step and the tapping step using the tap hole 9a described above are repeated, smooth and rapid tapping can be conducted while keeping the furnace erect without tilting and injection (melting operation) can be continued during the tapping operation. Thus, the molten iron productivity can be stably increased.

However, wear of the refractories of the tap hole 9a proceeds significantly fast compared to furnace refractories of other portions because of wear caused by molten iron flow and oxidation caused by molten slag during tapping. Thus, switching to the tap hole 9b of the next stage is conducted before the amount of wear of the refractories of the tap hole 9a becomes excessively large.

The amount of wear of the refractories of the tap hole 9a can be estimated from the measurement results of the thickness of the remaining refractories in an old furnace, for example. Instead of or in addition to this estimation, the amount of wear can be estimated on-line from the changes in observed temperatures (observed temperature at the rear side of bricks and/or shell) with a thermocouple embedded in the refractories.

Switching of the tap hole from 9a to 9b may be conducted according to the position of the bath surface of the molten iron that changes along with the progress of the wear of the refractories under conditions that maintain the amount of molten iron retained in the furnace (molten iron retention amount) constant.

Figure 2A:
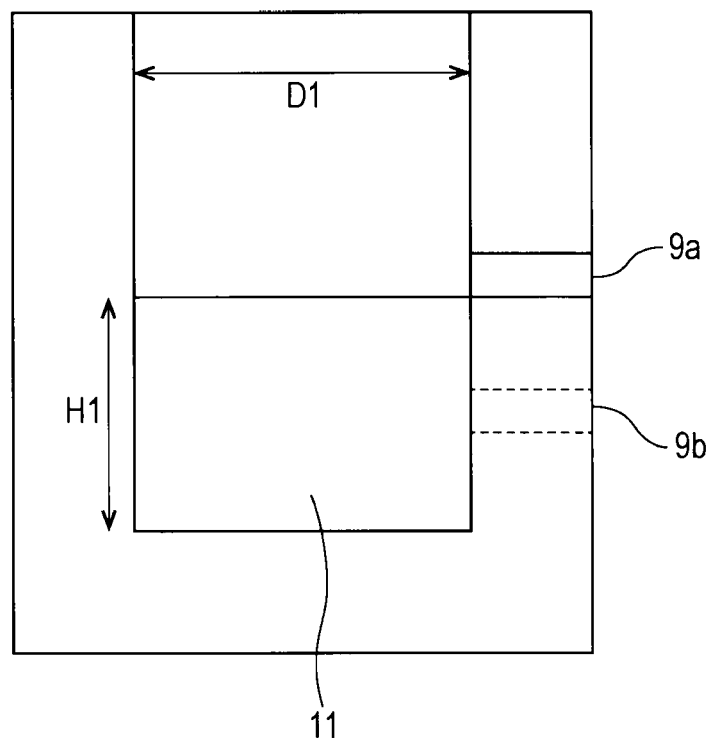
FIG. 2A is a vertical cross-sectional view of an iron bath-type melting furnace for describing a method for determining the distance between tap holes in a height direction.

For example, in FIGS. 2A and 2B, switching from 9a to 9b may be conducted when the bath surface position of the molten iron layer 11 is closer to the height position of 9b than the height position of 9a provided that the molten iron retention amount is the same as that of the new furnace. Alternatively, switching from 9a to 9b may be conducted when the bath surface position of the molten iron layer 11 reaches the height position of 9b provided that the molten iron retention amount is the same as that of the new furnace.

After finishing the role as a tap hole, the tap hole 9a may be completely closed by filling monolithic refractories or the like instead of mud since there is no need to open the hole thereafter.

Every time the tap holes 9 are switched (changed), the target position for the tap hole opener and the mud gun is changed. For example, the structures shown in FIGS. 4, 5A, and 5B may be employed.

Figure 4:
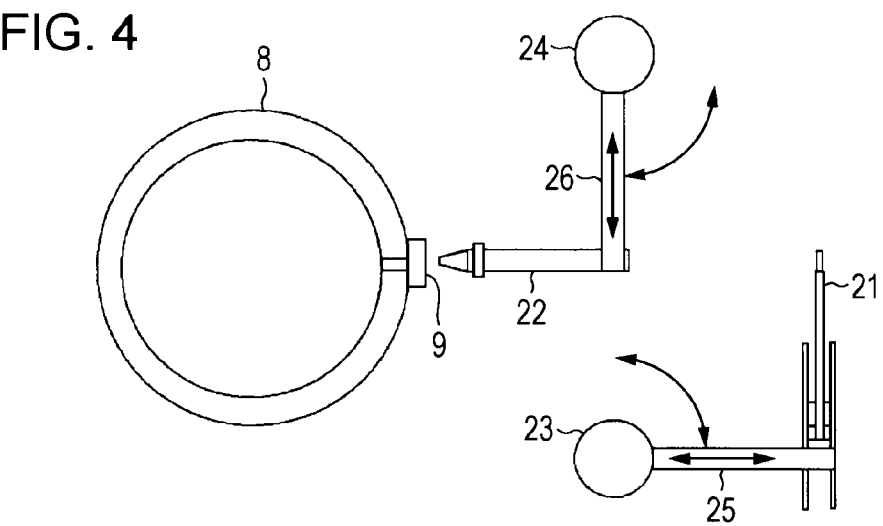
FIG. 4 is a horizontal cross-sectional view schematically showing an embodiment of arranging a tap hole opener and a mud gun in front of a furnace.

In FIG. 4, two columns 23 and 24 are built in front of the furnace and a tap hole opener 21 and a mud gun 22 are respectively attached thereto with expandable and contractible arms 25 and 26 so that the opener and gun can independently rotate about the columns in horizontal directions and move up and down along the columns 23 and 24.

Figure 5A:
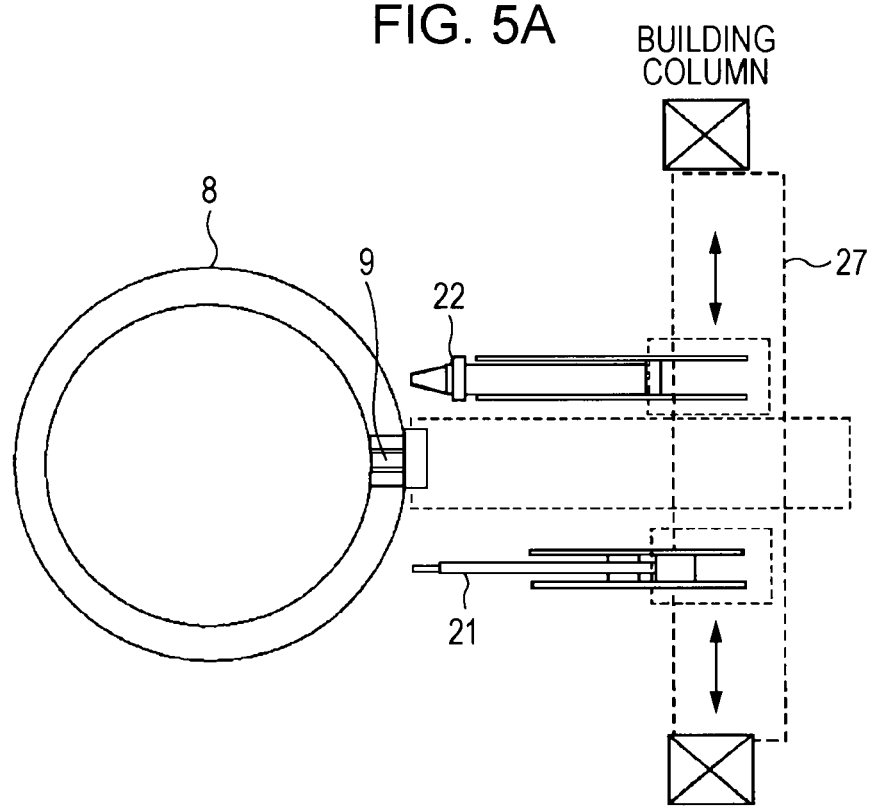
FIG. 5A is a horizontal cross-sectional view schematically showing another embodiment of arranging a tap hole opener and a mud gun in front of a furnace.
Figure 5B:
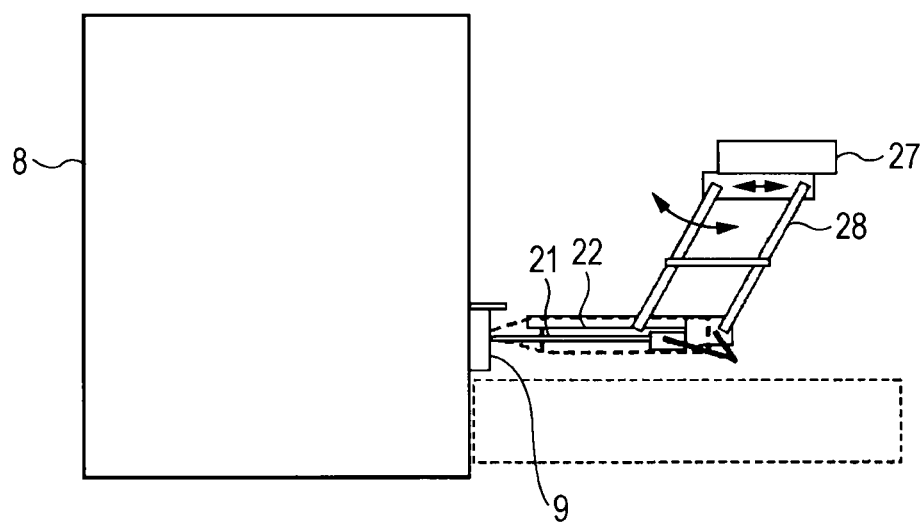
FIG. 5B is a front view schematically showing another embodiment of arranging a tap hole opener and a mud gun in front of a furnace.

In FIGS. 5A and 5B, a guide rail 27 is installed in front of the furnace in a direction orthogonal to the axis direction of the tap holes 9, the tap hole opener 21 and the mud gun 22 are installed so that they can move in horizontal directions along the guide rail 27, and a link mechanism 28 is provided so that the tap hole opener 21 and the mud gun 22 can be independently moved up and down.

(Modification)

Figure 6A:
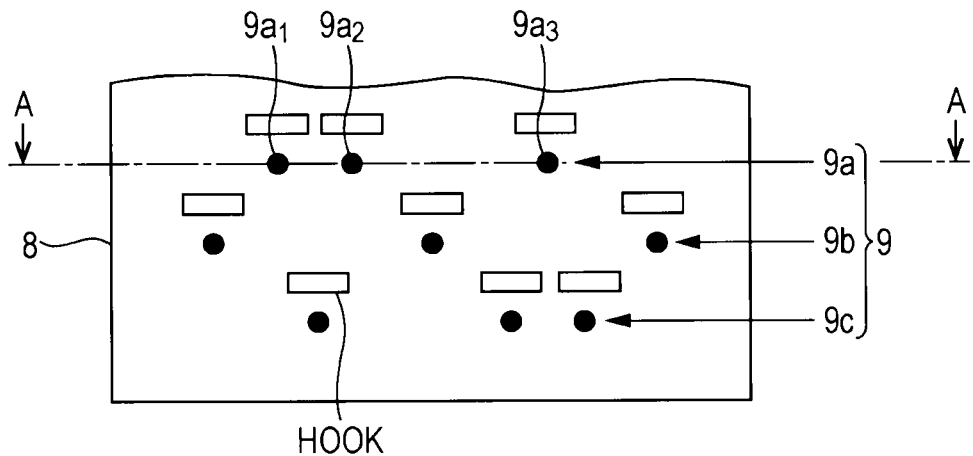
FIG. 6A is a partial front view schematically showing an example of arranging tap holes in a furnace wall.
Figure 6B:
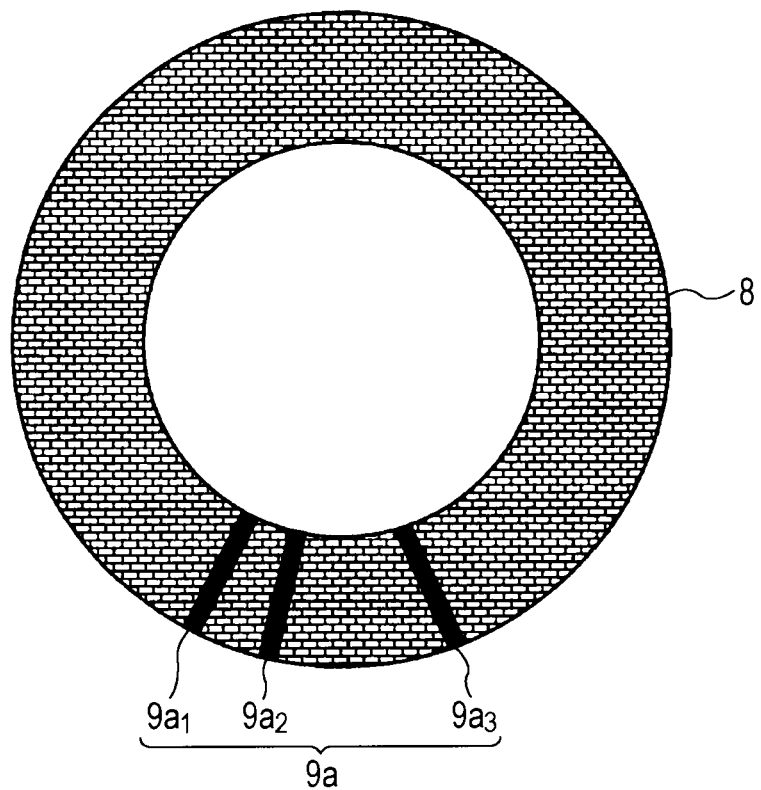
FIG. 6B is a horizontal cross-sectional view taken along line A-A in FIG. 6A.

In the embodiments above, the tap holes 9 are provided so that one tap hole is provided for one height position (horizontal circumference direction) of the furnace; however, as shown in FIGS. 6A and 6B, tap holes may be provided at two or more positions (three positions in this example, e.g., 9a1, 9a2, and 9a3 at the uppermost stage) at the same height position (horizontal circumference direction) of the furnace and these tap holes (9a1, 9a2, and 9a3) may be switched in cycles and used in tapping the hot metal and slag until the tap holes are switched to those of the next stage.

In the embodiments described above, only examples in which tap holes are used to drain both molten iron and molten slag are described. However, for example, when the amount of the molten slag generated is large, one of the tap holes (9a1, 9a2, and 9a3) at different positions in the horizontal circumference direction of the furnace may be used exclusively for draining the molten slag.

REFERENCE SIGNS LIST 1 iron bath-type melting furnace
2 throat
3 exhaust gas duct
4 raw material charging chute
5 top lance
6 furnace bottom
7 bottom tuyere
8 furnace wall
9, 9a, 9b, 9c tap hole
10 skirt
11 molten iron layer
12 molten slag layer
A inert gas (nitrogen gas)
B raw material iron source (solid reduced iron)
C carbonaceous material (coal)
D slag-forming material
E oxygen-containing gas (oxygen gas)

The invention claimed is:

1. An iron melting furnace comprising:
a furnace body lined with a refractory lining material and having a top opening through which raw materials including a raw material iron source, a carbonaceous material and a slag forming material may be introduced into the furnace body;
a heating system for injecting oxygen-containing gas into the furnace body to combust the carbonaceous material, whereby combustion heat can melt the raw material iron source to generate molten iron and molten slag to form a molten iron and slag bath;
a plurality of tap holes which penetrate the furnace body and which are provided at positions different from one another in a height direction of the furnace body; and
a refractory filling material, different from the material of the refractory lining material, filling at least one of said tap holes such that molten iron or slag in the furnace is unable to flow through the at least one tap hole being filled with the refractory filling material,
wherein the refractor filling material fills at least two of said to holes and wherein the composition of a part of the refractory filling material is different for each of said at least two tap holes.

2. The iron melting furnace according to claim 1, wherein the refractory filling material filling a part of the topmost of the at least two of said tap holes has a composition more resistant to slag erosion than the refractory filling material filling a part of at least one of the other of the at least two of said tap holes.

3. An iron melting furnace comprising:
a furnace body lined with a refractory lining material and having a top opening through which raw materials including a raw material iron source, a carbonaceous material and a slag forming material may be introduced into the furnace body;
a heating system for injecting oxygen-containing gas into the furnace body to combust the carbonaceous material, whereby combustion heat can melt the raw material iron source to generate molten iron and molten slag to form a molten iron and slag bath;
a plurality of tap holes which penetrate the furnace body and which are provided at positions different from one another in a height direction of the furnace body; and
a refractory filling material, different from the material of the refractory lining material, filling at least one of said tap holes such that molten iron or slag in the furnace is unable to flow through the at least one tap hole being filled with the refractory filling material,
wherein the refractory lining material at a portion of the furnace body having the at least one of the tap holes has a composition at an inner side of the furnace body that is different from a composition thereof at an outer side of the furnace body, and wherein the composition of the refractory lining material at the inner side of the furnace body is more resistant to molten iron flow than the composition of the refractory lining material at the outer side of the furnace body.

4. The iron melting furnace according to claim 1, wherein the refractory filling material filling the at least one of the tap holes has a composition at an inner side of the furnace body that is different from a composition thereof at an outer side of the furnace body, and wherein the composition of the refractory filling material at the inner side of the furnace body is more resistant to molten iron flow than the composition of the refractory filling material at the outer side of the furnace body.

* * * * *